US007325827B2

(12) United States Patent
Reiter et al.

(10) Patent No.: US 7,325,827 B2
(45) Date of Patent: Feb. 5, 2008

(54) INSTRUMENT PANEL FOR A MOTOR VEHICLE HAVING AN AIRBAG DEVICE INTEGRATED IN A VENTILATION ARRANGEMENT

(75) Inventors: Thomas Reiter, Dachau (DE); Karl-Heinz Sommer, Stockdorf (DE); Jörg Albert, Gemering (DE); Mathias Köppl, München (DE)

(73) Assignee: Autoliv Development AB, Vargarda (SE)

( * ) Notice: Subject to any disclaimer, the term of this patent is extended or adjusted under 35 U.S.C. 154(b) by 294 days.

(21) Appl. No.: 10/534,540

(22) PCT Filed: Oct. 1, 2003

(86) PCT No.: PCT/SE03/12613

§ 371 (c)(1),
(2), (4) Date: May 11, 2005

(87) PCT Pub. No.: WO2004/045920

PCT Pub. Date: Jun. 3, 2004

(65) Prior Publication Data

US 2007/0018440 A1 Jan. 25, 2007

(51) Int. Cl.
*B60R 21/20* (2006.01)

(52) U.S. Cl. .................................... 280/732; 280/728.2

(58) Field of Classification Search ................ 280/732, 280/728.2; 180/90; 296/70
See application file for complete search history.

(56) References Cited

U.S. PATENT DOCUMENTS 5,524,923 A 6/1996 Henseler
6,264,233 B1 7/2001 DeWitt
2002/0160706 A1* 10/2002 Elliot et al. ................. 454/121
2003/0001366 A1* 1/2003 Debler et al. ............... 280/732
2003/0222436 A1* 12/2003 Charbonnel .............. 280/728.2

FOREIGN PATENT DOCUMENTS

| | | |
|---|---|---|
| EP | 0 713 792 | 5/1996 |
| EP | 1 270 341 | 1/2003 |
| JP | 05185894 | 7/1993 |
| NL | 1 909 519 | 2/1965 |
| WO | WO 03/033310 | 4/2003 |

OTHER PUBLICATIONS

XP 000461344—2244—Research Disclosure, Jul. 1994, Combined Passenger Side Inflatable Restraint Door, Knee Bolster, and Duct Assembly.
XP 000461344—2244 Research Disclosure—Jul. 1994, No. 363, Emsworth, Great Britain—Combined Passenger Side Inflatable Restraint Door, Knee Bolster, and Duct Assembly.

* cited by examiner

*Primary Examiner*—Ruth Ilan
(74) *Attorney, Agent, or Firm*—Brinks Hofer Gilson & Lione

(57) ABSTRACT

An airbag module and instrument panel assembly for a motor vehicle having at least one ventilation outlet and a ventilation duct attached thereto and arranged behind an instrument panel. The airbag module is fastened behind the instrument patent and has a gas generator and a folded airbag arranged within its housing wherein a ventilation outlet is closed by a grid that opens when the airbag module is triggered and is provided within the instrument panel for the unfolding airbag. The airbag module is arranged adjacent to the ventilation duct in such a manner that when the airbag module is triggered, the airbag unfolds into the ventilation duct and from there unfolds out of the instrument panel through the ventilation outlet. The pressure of the unfolding airbag moves away from the ventilation outlet which is arranged within the instrument panel.

13 Claims, 4 Drawing Sheets

10
14
13
23
11
15
21
12
30
19
23
22
17
24
16
29
20

10
23
21
18
11
28
30
12
19
23
24
40
22
29

14
13
21
11
20
19
12
23
16
22
20

14
13
11
22
16
12
23
21

14
13
31
11
12
23
33
32
34
16

11
12
23
31
32
34
16

11
35
12
23
34
32
16

INSTRUMENT PANEL FOR A MOTOR VEHICLE HAVING AN AIRBAG DEVICE INTEGRATED IN A VENTILATION ARRANGEMENT

CROSS REFERENCE TO RELATED APPLICATION

This application claims priority to PCT/EP2003/012613, filed Nov. 12, 2003 and GB 10253185.4, filed Nov. 15, 2002.

FIELD OF THE INVENTION

This invention relates to an instrument panel for a motor vehicle comprising of at least one ventilation outlet and a ventilation duct attached thereto and arranged behind the instrument panel, and further having an airbag module which is fastened behind the instrument panel and has a gas generator and a folded airbag arranged within its housing. An outlet opening, which is closed by a covering that opens when the airbag module is triggered, is provided within the instrument panel for the unfolding airbag.

BACKGROUND OF THE INVENTION

An instrument panel of the type related to this invention is known from U.S. Pat. No. 6,264,233. To the extent that an airbag module and a ventilation duct are arranged behind the instrument panel of a vehicle, there is provided a covering that covers both components and on the one hand forms the covering for the airbag module and on the other hand has integrated within itself a ventilation outlet having a ventilation cover covering the outlet the ventilation cover of that design being attached to the ventilation duct when the cover or ventilation outlet respectively is still in the position established within the instrument panel. The unfolding airbag forces the covering open when the airbag module is triggered, and the ventilation outlet also releases itself from the ventilation duct fastened to the instrument panel.

The known instrument panel and the fitting arrangement of ventilation duct and airbag module of the type described above has the disadvantage that a correspondingly large space is required for accommodating an airbag module behind the instrument panel and that the common covering for the ventilation duct and airbag module features substantial dimensions, this covering to be opened when a trigger occurs.

In view of the foregoing it is an object of the invention to reduce the space requirement for the fitting arrangement of the airbag module behind the instrument panel in an instrument panel.

This object, including advantageous embodiments and further developments of the invention, is accomplished by the content of the claims that follow this description.

SUMMARY OF THE INVENTION

The basic concept of the invention provides an airbag module arranged adjacent to the ventilation duct in such a manner that, when the airbag module is triggered, the airbag unfolds into the ventilation duct and from there unfolds out of the instrument panel through the ventilation outlet, the pressure of the unfolding airbag moving away the ventilation outlet arranged within the instrument panel. The invention has the advantage that the opening in the instrument panel, which is necessary for providing ventilation is also used for the escape of the airbag from the airbag module, so that it is possible to dispense with an extra openable covering provided in the instrument panel for the escape of the airbag. Since the ventilation duct is simultaneously used as an escape channel for the airbag when the airbag unfolds, a much more space-saving packaging arrangement of the airbag module behind the instrument panel is possible.

In one exemplary embodiment of the invention, housing wall of the airbag module is adjacent to the ventilation duct and forms a dividing wall for the duct and, when the airbag module is triggered, moves into the duct in such a manner that there is formed an escape channel leading from the airbag module to the ventilation outlet. In this exemplary embodiment, there remains open, within the wall enclosing the ventilation duct, a subregion that is closed by the assigned housing wall of the airbag module when the airbag module is installed.

An alternative form of the invention may be provided that the dividing wall of the ventilation duct adjacent to the airbag module forms a housing wall for the airbag module and that, when the airbag module is triggered, the common dividing wall and housing wall moves into the ventilation duct in such a manner that there is formed an escape channel leading from the airbag module to the ventilation outlet. In this embodiment, the common dividing and housing wall is assigned to the ventilation duct, so that it is possible to dispense with an additional wall on the housing of the airbag. This has the advantage that the required motion of the common dividing and housing wall into the ventilation duct may already be taken into consideration during the design and manufacture of the ventilation duct.

In one exemplary embodiment of the invention, it is provided that the airbag module is arranged laterally next to the ventilation duct and the dividing and housing wall swings into the ventilation duct around a fixed point located far from the instrument panel. In regard to the fitting arrangement of dividing and housing wall, it may here be provided that the ventilation outlet partially overlaps the airbag module and that region of the dividing and housing wall that faces the instrument panel forms a diagonal kink leading to that edge of the ventilation outlet located on the module side, the mutual dividing and housing wall running behind the ventilation outlet may be further provided that the kink is dimensioned in such a manner that the kink fits into place on the opposite edge of the ventilation outlet during the swinging of the dividing and housing wall, thus forming the escape channel for the unfolding airbag.

In an alternative embodiment, the invention provides that the airbag module is arranged on the side of the ventilation duct opposite the instrument panel.

To reduce the overall depth of the fitting arrangement of ventilation duct and airbag module behind the instrument panel according to this invention in it may be provided that the airbag module is designed L-shaped with one section located laterally next to the ventilation duct and one section located the ventilation duct opposite the instrument panel, the common dividing and housing walls of the ventilation duct adjacent to the airbag module being integrally joined together and swinging into the ventilation duct when the airbag module is deployed.

Since a separate direct opening in the instrument panel is not required as an escape hole for the airbag, measures are provided in one exemplary embodiment of the invention to ensure that the airbag reliably unfolds out of the airbag module through the ventilation duct. For this purpose, it is provided that a partition wall arranged within the housing of the airbag module divides the airbag, which is folded into the housing, into two folding packages, one folding package being arranged adjacent to the ventilation outlet. In this case it may be advantageous for the folding package adjacent to the ventilation outlet to have a smaller dimension than the second folding package and act as a starting bubble for pulling out the second folding package when the airbag module is triggered. Depending on the structural factors, the invention also includes the concept that the fitting arrangement of a plurality of partition walls divides the folded airbag into a plurality of folding packages.

In regard to installing an airbag module onto the ventilation duct, it may be provided that a holding device attaches the airbag module to the ventilation duct and fastens it to the interior of the instrument panel.

In one exemplary embodiment of the invention, it is provided that a cover covers and holds the airbag in the vicinity where the airbag module is connected to the mutual dividing and housing wall, the airbag being folded into the housing and the foil tearing open when the airbag unfolds and protection between the airbag and the edges of the ventilation outlet.

Since a very narrowly designed ventilation outlet may cause problems in regard to the speed at which the airbag unfolds, it is provided in one exemplary embodiment of the invention that predetermined breaking lines separate the vicinity of the instrument panel adjacent to the ventilation outlet from the rest of the instrument panel so that the unfolding airbag separates, from the instrument panel, both the separated region and the ventilation outlet combining to act as escape hole for the airbag. In this case, the specified area of the instrument panel advantageously enlarges the escape hole for the airbag appropriately.

BRIEF DESCRIPTION OF THE DRAWINGS

The drawing depicts exemplary embodiments of the invention, which will be described below. The drawing shows.

DETAILED DESCRIPTION OF THE INVENTION

Figure 1:
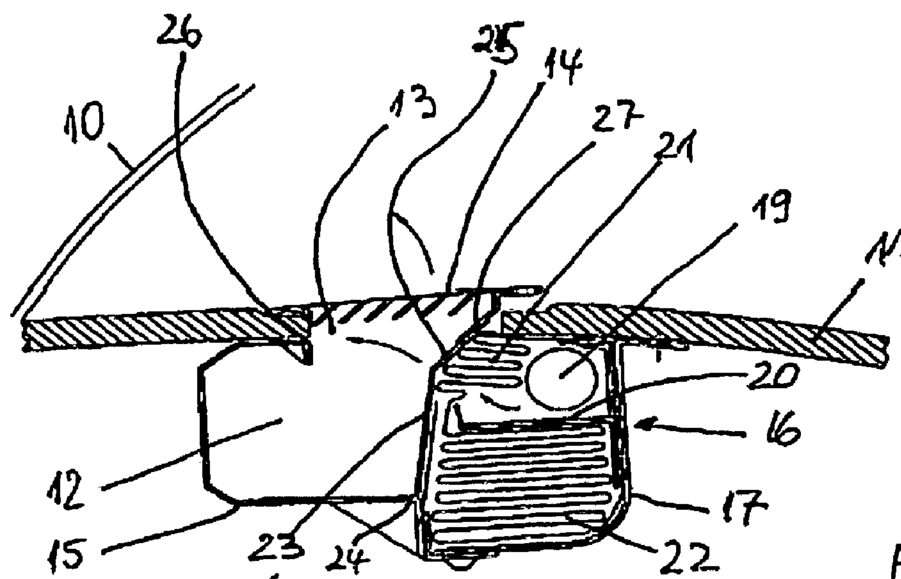
FIG. 1 is a longitudinal section of a subregion of an instrument panel having ventilation arrangement and airbag device according to a first embodiment of this invention prior to triggering of the airbag device.

FIG. 1 depicts an instrument panel 11 contiguous to a windshield 10 of a motor vehicle in which an opening for both the ventilation outlet and escape of the airbag is arranged directed upwardly toward the windshield 10, so that in this fitting arrangement of the instrument panel, both the ventilation duct and airbag module are underneath the instrument panel 11 relative to the windshield.

In particular, there is provided within the instrument panel a ventilation outlet 13, which is covered by a ventilation grill 14, which fits into the instrument panel 11 with positive fit. A ventilation duct 12, which is enclosed by walls 15 and for example spreads the air supply across the width of the vehicle underneath the instrument panel 11, is arranged underneath the ventilation outlet 13, the air supply being conveyed into the passenger compartment if necessary by a plurality of ventilation outlets 13 configured in the instrument panel 11.

As still to be described in detail, an airbag module 16, within whose housing 17 a gas generator 19 and a folded airbag 18 are arranged, is positioned underneath the instrument panel 11 and directly adjacent to a ventilation duct 12. A partition wall 20 arranged in the housing 17 of the airbag module 16 divides the folded airbag 18 into two folded, and specifically into one folded package 21 directly adjacent to the ventilation outlet 13 and one folded package 22 arranged on the opposite side of the partition wall 20.

To the extent that the ventilation duct 12 and airbag module 16 contact one another because of their directly adjacent arrangement, there is provided a mutual dividing and housing wall 23 which, as cooperating with walls 15 and defining the ventilation duct 12. The wall 23 is connected one of walls 15 of the ventilation duct 12 at a hinge connection 24 in such a manner that the pressure of the unfolding airbag 18 swings the dividing and housing wall 23 into the ventilation duct 12 when the airbag module 16 is triggered.

In this case the dividing and housing wall 23 is arranged relative to the ventilation outlet 13 in such a manner that the ventilation outlet 13 overlaps the mutual dividing and housing wall 23, wherein the region of this wall that faces the instrument panel 11 and is contiguous with the instrument panel 11 forms a diagonal kink 25 leading to the edge of the ventilation outlet 13 running on the side of the airbag module 16, the dividing and housing wall 23 running behind the ventilation outlet 13. This kink 25 is dimensioned in such a manner, that the edge of wall 23 fits into place on the opposite edge 26 of the ventilation outlet 13 when the mutual dividing and housing wall 23 swings into the ventilation duct 12, thus forming and delimiting an escape channel 40 for the unfolding airbag 18.

To the extent that the ventilation outlet 13 is closed by a ventilation grill 14, a rebound strap 28 holds the ventilation grill on the instrument panel 11 so that the ventilation grill 14 will not fly around the passenger compartment when instrument panel 11 releases the ventilation grill 14. The region of the ventilation grill 14 facing the airbag module 16 also includes an air baffle 27 extending behind the instrument panel 11 to the ventilation facing 14 to open forcefully.

Figure 2:
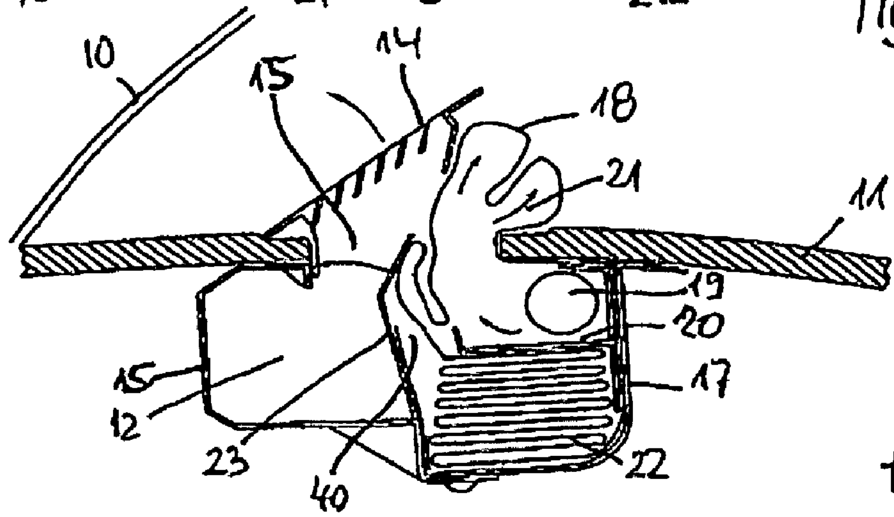
FIG. 2 shows the airbag device shown in FIG. 1 in a first stage of unfolding of the airbag during deployment of the airbag device.
Figure 3:
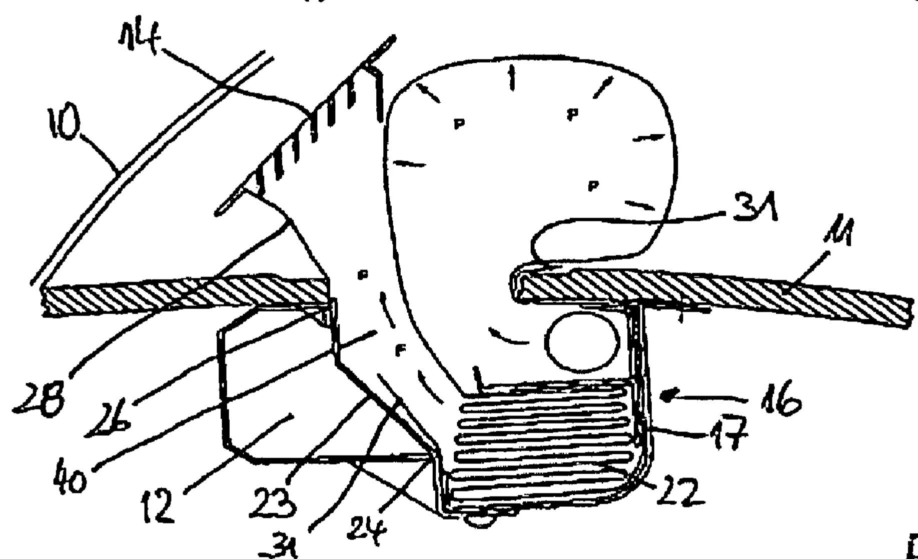
FIG. 3 shows the airbag device shown in FIG. 1 in an advanced stage of unfolding of the airbag during deployment of the airbag device.

FIGS. 1 to 3 depict the triggering of the airbag module 16 in detail, FIG. 2 showing that the gas released by the gas generator 19 when the gas generator is ignited first pressurizes the first folded package 21 facing the instrument panel 11, so that this folding package exerts a corresponding pressure on the dividing and housing wall 23 toward the ventilation duct 12. This pressure presses the dividing and housing wall 23 around the hinge connection 24 inwards into the ventilation duct 12. At the same time, the folded package 21, which unfolds next, exerts a corresponding upwardly-directed pressure on the ventilation grill 14 because of the air baffle 27 located on the underside of the ventilation grill 14, forces the ventilation grill 14 to swing open in the direction of the windshield 10 and releases the ventilation outlet 13 as an unfolding hole for the airbag 18. In this respect, after the ignition of the gas generator 19, the first folding package 21 first acts as an extraction bubble that then pulls the second folding package 22 arranged underneath the partition wall 20 out of the housing 17 of the airbag module 16 during the further gas pressurization.

In the case of very narrow ventilation outlet 13 and grill 14, it may be provided that predetermined breaking lines separate, from the rest of the instrument panel 11, in that region of the instrument panel 11 adjacent to the respective ventilation outlet 13 and preferably surrounding the ventilation outlet 13. In such a configuration, when the airbag module 16 unfolds, the unfolding airbag detaches both the region of the instrument panel 11 separated by predetermined breaking lines and the ventilation outlet 13 from the instrument panel 11 so that an appropriately larger escape hole is formed for the airbag 18.

Figure 4:
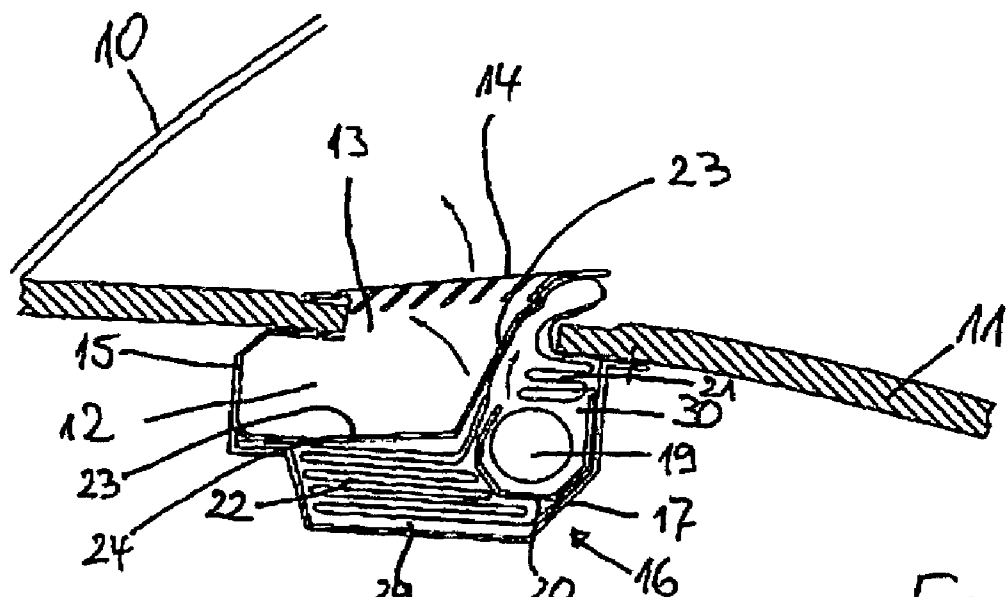
FIG. 4 is a cross-sectional view of a second embodiment of the airbag device of this invention.
Figure 5:
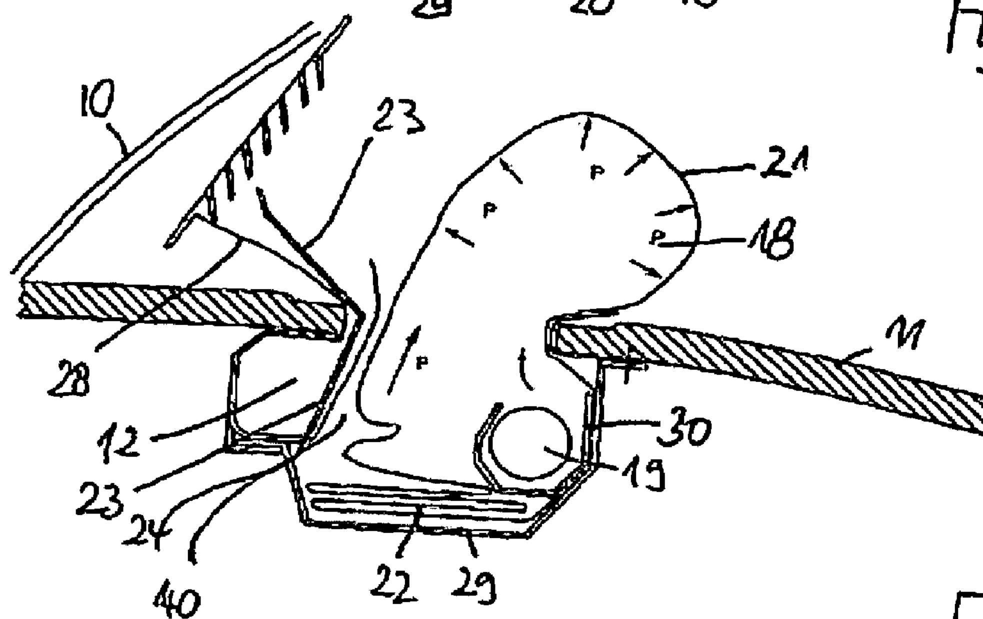
FIG. 5 shows the airbag device of FIG. 4 in a stage of partial unfolding of the airbag during deployment.

The exemplary embodiment that is depicted in FIG. 4 and whose triggering is depicted in FIG. 5 differs from the exemplary embodiment previously described in FIGS. 1 to 3 in that the airbag module 16 is configured L-shaped, having one section 30 located laterally next to ventilation duct 12 and one section 29 located behind the ventilation duct 12 opposite instrument panel 11, so that the airbag module 16 wraps partially around the ventilation duct 12. This provides a particularly space-saving fitting arrangement of ventilation duct 12 and airbag module 16. In this design of airbag module 16, two wall sections of ventilation duct 12 each form adjacent mutual dividing and housing walls 23 which are integrally joined together and again swing into the ventilation duct 12 around a hinge-like connection 24 when the airbag module is triggered. Because the fitting arrangement of partition wall 20, which is again provided, is matched to the shape of airbag module 16, the design takes care that the first folding package 21, which the gas generator 19 first pressurizes, acts as extraction bubble for the second unfolding package 22, as described in FIGS. 1 to 3.

Figure 7:
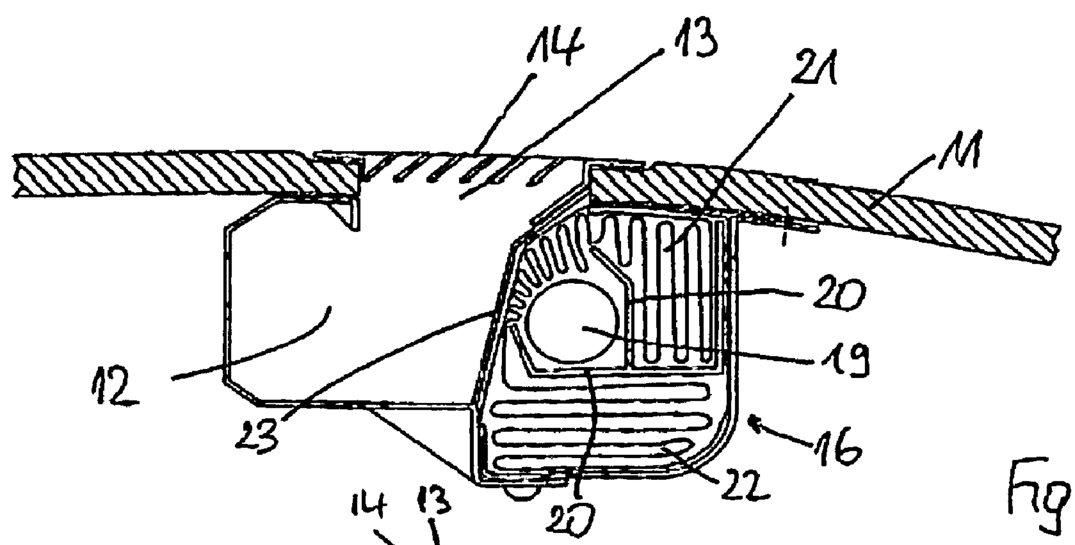
FIG. 7 shows an airbag arrangement in accordance with a fourth embodiment of this invention.
Figure 6:
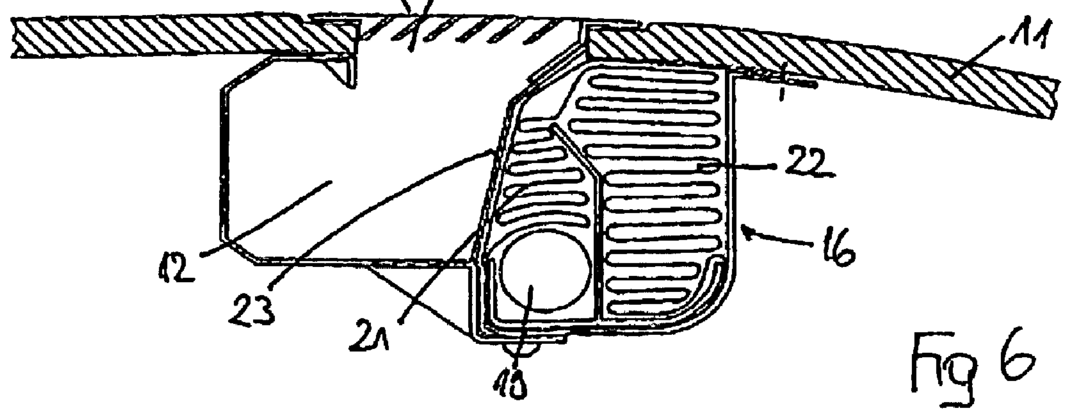
FIG. 6 shows an airbag arrangement in accordance with a third embodiment of this invention.

FIGS. 6 and 7 depict exemplary embodiments of the invention in which the partition wall 20 or plurality of partition walls 20, respectively, provided in housing 17 of airbag module 16 form corresponding first, second or further airbag folded packages in order to assure that the airbag 18 smoothly unfolds out of the airbag module 16 and ventilation duct 12, respectively, depending on the assignment of the airbag module 16 to the ventilation duct 12.

Figures 8A, 8B, 8C:
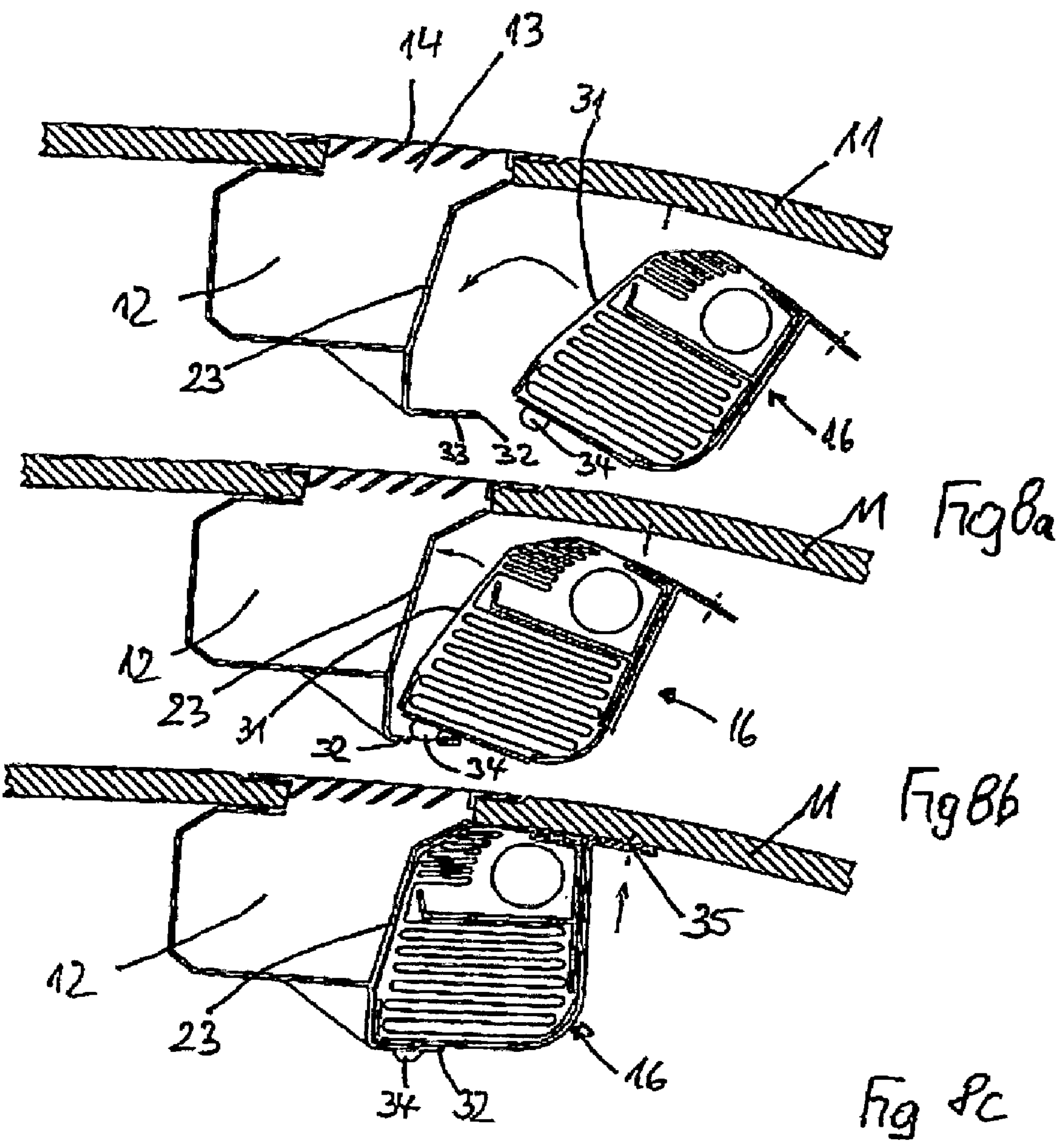
FIGS. 8*a-c* shows different stages of installation of the airbag device in accordance with this invention on the ventilation duct and instrument panel.

Finally, FIGS. 8*a-c* show that simplified installation can be associated with the design of an instrument panel having the ventilation arrangement and airbag device according to invention. Here the ventilation duct 12 and its assigned walls 15 and 23 are fastened to the instrument panel 11. In this case the ventilation duct 12 is provided with a mounting plate 32, which is arranged to accommodate the airbag module 16 and has an opening 33 built therein, wherein a projecting part 34 configured on the airbag module 16 is used to insert the airbag module into the opening 30 of the mounting plate 32 and, after the airbag module has been swung toward the mutual dividing and housing wall 23, it is fastened to the instrument panel 11 using a fastener 35. For this installation procedure, the airbag module 16 is provided with a cover layer 31 for the folded airbag 18 when it fits into place on the dividing and housing wall 23, which is common with the ventilation duct 12, this cover layer preferably being made of a welded-on foil that tears open from the pressure of the unfolding airbag. As evident from FIG. 3, the cover 31 may be configured in such a manner that it lies as protection between the airbag 18 and the edges of the ventilation outlet in particular when the airbag 18 unfolds, so that the fabric of the airbag 18 is treated gently and there is a reduced danger that the fabric will tear.

The characteristics of the object of these documents disclosed in the above description, the claims, the abstract and the drawing may be essential for the realization of the invention in its various embodiments both individually and in any desired combination with each other.

The invention claimed is:

1. An airbag module and instrument panel assembly for a motor vehicle having at least one ventilation outlet and a ventilation duct attached thereto and arranged behind an instrument panel, and an airbag module which is fastened behind the instrument panel and having a gas generator and a folded airbag arranged within a housing, the airbag housing having within it a partition wall arranged to divide the airbag into a first and a second package, the first folding package being arranged adjacent to the ventilation outlet which is closed by a grill, the assembly comprising the airbag module being arranged adjacent to the ventilation duct in such a manner that, when the airbag module is triggered, the airbag unfolds into the ventilation duct and from there unfolds out of the instrument panel through the ventilation outlet opening, the pressure of the unfolding airbag moving away the grill arranged within the instrument panel.

2. An airbag module and instrument panel assembly according to claim 1, wherein predetermined breaking lines separate a segment of the instrument panel adjacent to the ventilation outlet from the remainder of the instrument panel so that the unfolding airbag separates the segments from the remainder of the instrument panel, and both the separated segment and the ventilation outlet form an escape hole for the airbag.

3. An airbag module and instrument panel assembly according to claim 1, wherein the partition wall divides the folded airbag into the first and second folding packages.

4. An airbag module and instrument panel assembly according to claim 1, wherein a housing wall of the airbag module adjacent to the ventilation duct forms a dividing wall for the ventilation duct and, when the airbag module is triggered, the dividing wall moves into the ventilation duct in such a manner that there is formed an escape channel leading from the airbag module to the ventilation outlet.

5. An airbag module and instrument panel assembly according to claim 1, wherein a dividing wall of the ventilation duct is adjacent to the airbag module and forms a housing wall for the airbag module and when the airbag module is triggered, the dividing wall moves into the ventilation duct in such a manner that there is formed an escape channel leading from the airbag module to the ventilation outlet.

6. An airbag module and instrument panel assembly according to claim 1, wherein the airbag module is arranged laterally next to the ventilation duct and a dividing and housing wall, located adjacent to the airbag module and forming a housing wall for the airbag module, swings into the ventilation duct around a fixed point.

7. An airbag module and instrument panel assembly according to claim 1, wherein the airbag module is arranged on a side of the ventilation duct opposite the instrument panel.

8. An airbag module and instrument panel assembly according to claim 7, wherein the airbag module is designed L-shaped with a first section located laterally next to the ventilation duct and a second section located on the side of the ventilation duct opposite the instrument panel, and further wherein a dividing wall, located adjacent to the airbag module and forming a housing wall for the airbag module, is integrally joined together over the first and second sections, and swings into the ventilation duct when the airbag module is triggered.

9. An airbag module and instrument panel assembly according to claim 1, wherein the first folding package adjacent to the ventilation outlet has a smaller dimension than the second folding package and acts as a starting bubble for the pulling out of the second folding package when the airbag module is triggered.

10. An airbag module and instrument panel assembly for a motor vehicle having at least one ventilation outlet and a ventilation duct attached thereto and arranged behind an instrument panel, and an airbag module which is fastened behind the instrument panel and having a gas generator and a folded airbag and further having a ventilation outlet opening which is closed by a grill, the assembly further having a dividing wall of the ventilation duct adjacent to the airbag module and forming a housing wall for the airbag module, and further wherein the ventilation outlet partially overlaps the airbag module, and further wherein a region of the dividing wall that faces the instrument panel forms a diagonal kink leading to an edge of the ventilation outlet located adjacent the module, and wherein the dividing and housing wall runs behind the ventilation outlet, the assembly comprising the airbag module being arranged adjacent to the ventilation duct in such a manner that, when the airbag module is triggered, the dividing wall moves into the ventilation duct in such a manner that there is formed an escape channel leading from the airbag module to the ventilation outlet, such that the airbag unfolds into the ventilation duct and from there unfolds out of the instrument panel through the ventilation outlet opening, the pressure of the unfolding airbag moving away the grill arranged within the instrument panel.

11. An airbag module and instrument panel assembly according to claim 10, wherein the kink is dimensioned such that the kink fits into place on an opposite edge of the ventilation outlet during the swinging of the dividing wall, thus forming and delimiting the escape channel for the unfolding airbag.

12. An airbag module and instrument panel assembly for a motor vehicle having at least one ventilation outlet and a ventilation duct attached thereto and arranged behind an instrument panel, and an airbag module which is fastened behind the instrument panel and having a gas generator and a folded airbag and further having a ventilation outlet opening which is closed by a grill, the assembly comprising the airbag module being attached to the ventilation duct by means of a holding device which fastens the airbag module to the interior of the instrument panel in such a manner that, when the airbag module is triggered, the airbag unfolds itself into the ventilation duct and from there unfolds out of the instrument panel through the ventilation outlet opening, the pressure of the unfolding airbag moving away the grill arranged within the instrument panel.

13. An airbag module and instrument panel assembly for a motor vehicle having at least one ventilation outlet and a ventilation duct attached thereto and arranged behind an instrument panel, and an airbag module which is fastened behind the instrument panel and having a gas generator and a folded airbag and further having a ventilation outlet opening which is closed by a grill, and further having a cover covering and holding the airbag in the vicinity where the airbag module is connected to a dividing wall of the ventilation duct, the dividing wall located adjacent to the airbag module and forming a housing wall for the airbag module, the airbag being folded into the housing, the assembly comprising the airbag being arranged adjacent to the ventilation duct in such a manner that, when the airbag module is triggered, the cover opening when the airbag unfolds and lying down as protection between the airbag and edges of the ventilation outlet, and the airbag unfolding into the ventilation duct and from there unfolding out of the instrument panel through the ventilation outlet opening, the pressure of the unfolding airbag moving away the grill arranged within the instrument panel.

* * * * *